US005561902A

United States Patent [19]
Jacobs et al.

[11] Patent Number: 5,561,902
[45] Date of Patent: Oct. 8, 1996

[54] METHOD OF MANUFACTURING A LADDER FRAME ASSEMBLY FOR A MOTOR VEHICLE

[75] Inventors: Kenneth B. Jacobs, Spring Grove, Pa.; Frank A. Horton, Rochester Hills, Mich.; Howard A. Mayo, III, Airville, Pa.

[73] Assignee: Cosma International Inc., Markham, Canada

[21] Appl. No.: 314,496

[22] Filed: Sep. 28, 1994

[51] Int. Cl.$^6$ ............... B23K 15/00; B21D 7/08; B21D 26/02; B62D 21/02
[52] U.S. Cl. ............. 29/897.2; 29/421.1; 29/897.35; 29/DIG. 3; 72/61; 280/785; 280/799; 280/800; 296/29; 296/204
[58] Field of Search ............... 29/522.1, 897.2, 29/897.35, 897, DIG. 3, DIG. 32, 421.1; 72/58.61, 62, 220; 280/781, 799, 800, 785, 797; 296/29, 203, 204; 228/173.4; 52/729.1

[56] References Cited

U.S. PATENT DOCUMENTS

| | | | |
|---|---|---|---|
| 2,009,963 | 7/1935 | Matthaei | 280/797 X |
| 2,127,618 | 8/1938 | Riemenschmeider . | |
| 2,277,615 | 3/1942 | Townsend | 29/897.35 |
| 2,784,983 | 3/1957 | Dean | 296/29 X |
| 2,901,266 | 8/1959 | Lindsay | 280/797 X |
| 3,156,034 | 11/1964 | Gruetjen | 280/781 X |
| 3,406,439 | 10/1968 | Hutchens | 29/897.2 |
| 3,902,350 | 9/1975 | McManus | 29/DIG. 3 X |
| 4,147,379 | 4/1979 | Winslow | 280/781 |
| 4,386,792 | 6/1983 | Moore et al. | 280/785 X |
| 4,567,743 | 2/1986 | Cudini . | |
| 5,070,717 | 12/1991 | Boyd et al. . | |

(List continued on next page.)

FOREIGN PATENT DOCUMENTS

| | | | |
|---|---|---|---|
| 626852 | 9/1961 | Canada | 29/897.2 |
| 56-77004 | 6/1981 | Japan | 29/DIG. 3 |
| 1538962 | 1/1990 | U.S.S.R. | 29/897.2 |

OTHER PUBLICATIONS

Ebbinghaus et al, "Gesenkschmiede mit neuer Technologie", Carl Hanser Verlag, Munchen 1989, 6 paes in German, plus 15 page English translation Die–forging with New Technology.

Ebbinghaus, "Wirtschaftliches Konstruieren mit innenhochdruck–umgeformten Prazisions–Werkstucken", Carl Hanser Verlag, Munchen 1990, 3 pages in German, plus 6 page English translation Efficient Designing with Precision Components Formed by the Internal High Pressure Technique.

(List continued on next page.)

Primary Examiner—Peter Vo
Attorney, Agent, or Firm—Cushman Darby & Cushman

[57] ABSTRACT

A rail frame assembly for a motor vehicle comprises a rearward frame module having a pair of generally parallel rearward frame rail members interconnected by a rearward cross-member assembly. A central frame module includes a pair of generally parallel central frame rail members interconnected by a central cross-member assembly, the central frame members each having a generally U-shaped transverse cross-sectional configuration including a vertical base wall portion and a pair of outwardly extending generally parallel horizontal wall portions extending from opposite ends of the base wall portion. The U-shaped central frame members are each bent between two spaced positions thereof, and one of the horizontal wall portions extending from one end of the base wall portion has metallic grains therein substantially stretched at a location between the spaced positions. In addition, an opposite one of the horizontal wall portions extending from an opposite end of the base wall portion has metallic grains therein substantially compressed at the location between the spaced positions. In addition, a forward frame module comprises a pair of generally parallel tubular forward frame rail members interconnected by a forward cross-member assembly. The tubular forward frame rail members each having a generally rectangular transverse cross-section of irregular shape and size.

19 Claims, 8 Drawing Sheets

U.S. PATENT DOCUMENTS

| | | |
|---|---|---|
| 5,107,693 | 4/1992 | Olszewski et al. . |
| 5,114,169 | 5/1992 | Botkin et al. .................. 29/897.2 X |
| 5,233,854 | 8/1993 | Bowman et al. . |
| 5,239,852 | 8/1993 | Roper . |
| 5,308,115 | 5/1994 | Ruehl et al. .................... 280/800 X |
| 5,333,775 | 8/1994 | Bruggemann et al. ............ 72/61 X |
| 5,339,667 | 8/1994 | Shah et al. ..................... 29/421.1 X |
| 5,353,618 | 10/1994 | Roper et al. ........................ 72/58 |
| 5,357,774 | 10/1994 | Klages et al. ...................... 72/62 |
| 5,445,002 | 8/1995 | Cudini et al. .................. 29/421.1 X |

OTHER PUBLICATIONS

Ebbinghaus et al, "Prazisions–Werkstucke in Leichtbauweise, hergestellt durch Innenhochdruck–Umformen", Metallumtoform–Technik, pp. 15–19, (German), plus 5 page English translation Precision Workpieces in Lightweight Construction Manufactured by Internal High Pressure Shaping, from Metallumform–Technik, the magazine for applied metal shaping.

Ebbinghaus, "Innenhochdruckumformung: Hohlteile material–sparend hergestellt", Sonderdruck aus dem Industrie–Anzeiger, Nr. 20 vom Sept. 3, 1984, Gesenkschmiede Schneider GmbmH Aalen (4 pages in German), plus 11 page English translation, Internal High Pressure Shaping: Hollow Parts Produced in a Material Saving Manner, published in a special printing from Industrie–Anzeiger No. 20.

METHOD OF MANUFACTURING A LADDER FRAME ASSEMBLY FOR A MOTOR VEHICLE

BACKGROUND OF THE INVENTION

The present invention relates to ladder frame assemblies of motor vehicles and a method for forming the same.

In the field of motor vehicles, especially off road vehicles, pick-up trucks and similar vehicles, it has been known to provide a vehicle ladder frame assembly for mounting various components of the vehicle, such as the body, engine, suspension system, etc. Typically, the frame assembly includes a pair of lengthwise parallel siderails generally extending along opposite sides of the vehicle, and a plurality of transverse cross members interconnecting the siderails at spaced positions therealong. The frame assembly acts as the main load carrying member for rigidity and strength, as opposed to the body members for the "unibody" construction typically used in standard passenger cars.

In more recent years, vehicle frame assemblies have been manufactured with added modularity. More specifically, the vehicle frame assemblies may be conveniently divided into a forward frame module, central frame module, and a rearward frame module. This facilitates manufacture and permits certain frame modules to be used with more than one type or model vehicle. Moreover, modular design has the advantage that different portions of the frame assembly can be manufactured with different constructions. For example the forward frame module is preferably manufactured with closed bar siderails or rail members (i.e., having a closed transverse cross-sectional configuration) to provide the frame assembly with maximized strength for crashworthiness and torsional rigidity under the cab. The central and rear frame modules, on the other hand, are preferably manufactured with siderails having a U-shaped transverse cross sectional configuration, with the opened portion of the U-shaped configuration facing inwardly towards the center portions of the vehicle for better bending efficiency, of the frame assembly and to facilitate mounting of the cross members and other components. As used herein, the term U-shaped may be synonymous with a "C-shaped" configuration, wherein the term "C-shaped" refers to a more specific U-shaped configuration in which inwardly facing flanges are provided at the opposite ends of the U-shaped configuration. In addition, as used herein, the term "rail member" is interchangeable with the term "siderail".

In producing vehicle frame assemblies, manufacturers typically employ a stamping technique. Stamping is accomplished by utilizing one or more opposing stamping die members which compress (by impact) a sheet of raw metal, usually steel, therebetween to form siderail frame members and cross members of a desired shape (e.g., having the U-shaped cross sectional configuration). During the stamping process, the raw material is sequentially moved and stamped in different stamping die stations until the final shape is achieved. While stamping operations are advantageous in certain respects, the stamping dies and equipment are relatively expensive and must be replaced on a frequent basis. As a result, it can be appreciated that material labor and equipment costs associated with manufacturing and assembly of stamped frame members is significant.

Another problem associated with stamping a straight metal sheet is that a significant amount of raw material must be wasted, especially where irregularly shaped frame parts are required. More specifically, where irregular shapes are to be stamped from a sheet of raw metal, there is a significant amount of peripheral material (particularly at the side edges of the sheet) that cannot be used, irrespective of how closely the stamped shapes are nested on the sheet. In one analysis, it was found that up to 30%–40% of a roll of raw material could not be used due to the irregular shape of the stamped part. It can be appreciated that, at high volumes, the amount of material wasted, and costs associated therewith, is significant in the stamping method.

Another problem with stamping results from the assembly of the stamped members into a frame assembly. This assembly is typically done using a wire weld process that applies significant heat to the parts. During this assembly process, the stamped parts must be clamped into position to control the tendency of the stamped parts to spring back towards their original shape and the stresses that are created during heating and the forming process. Without clamping, these stresses might otherwise result in significant distortion of the assembly (6–12 mm overall are typical). This assembly cost and tooling at high volumes results in high investment, manufacturing cost and rework costs to obtain a quality assembly.

The patent literature has proposed a procedure in which a siderail frame member is roll-formed rather than stamped. More specifically, in U.S. Pat. No. 2,127,618, there is proposed an apparatus which passes a sheet of raw metal material through a series of cooperative rollers which sequentially bend the sheet into a tubular siderail member having a box-shaped transverse cross sectional configuration. Roll forming offers numerous advantages over stamping. For example, capital expenditures required for manufacturing equipment is significantly lower. In addition, since roll forming machines function without the stresses of high impact associated with stamping dies, they require less maintenance and have a longer useful life. Furthermore, since a sheet of material can be continuously passed through the series of rollers, frame siderail production times are faster. Additionally, since a sheet or strip of raw material is completely used in making a siderail, little or no raw material is wasted. Assembly process is minimized as members are rolled during rolling process into a complete closed box section. It can be appreciated, therefore, that manufacturing costs associated with roll forming is significantly less than with stamping.

The benefits of roll forming, however, have heretofore been limited by the process' inability to form siderails of any desired shape. For example, in the most desirable configuration, it advantageous not only to provide the central frame module siderail members with a U-shaped cross sectional configuration as aforesaid, but it is also desirable to provide the central portion of the siderail with bends in vertical direction, for example, to accommodate axle mountings for the rear wheels. Since, unlike stamping, the roll forming process can form only a straight siderail member (e.g., without any bending in the vertical direction), any vertical bends must be accomplished in a subsequent operation. For example, the aforementioned '618 patent contemplates that after formation, the straight box sectioned siderail can be bent in a bending mill to provide forward and rear kickup. While it is relatively simple to bend box-shaped cross sectional configuration because of its inherent strength, heretofore attempts at bending a roll-formed siderail member having a U-shaped configuration have been unsuccessful. More specifically, such attempts have been ineffective due to the relative weakness of an opened section configuration and its susceptibility to unwanted twisting and distortion. The use of a roll formed closed box tubular cross-sectioned, side frame member for the front rail has also been commercially omitted due to the necessity of the roll forming operations to form frame members having a constant cross section. This is impossible to package due to geometry requirements of the engine, front suspension, body and other engine compartment components. Resulting designs have not been efficient for material use and have been used only in low volume applications and large trucks where the investment savings can justify the material cost penalty and packaging constraints are not as severe.

There has thus been a need to manufacture a frame assembly for an automobile that addresses the concerns noted above. It is therefore an object of the present invention to meet this need. In accordance with the principles of the present invention this objective is achieved by providing a method for manufacturing a ladder frame assembly for a motor vehicle. Two of the steps of the method of the present invention comprise forming a rearward frame rail module and forming a forward frame rail module. Another step is forming a central frame rail module comprising a pair of central frame siderails, each of the central frame siderails being formed by 1) moving a sheet of metallic material through a series of cooperating rollers constructed and arranged to rollingly engage opposite sides of the sheet in a manner which bends the sheet into a configuration having a generally U-shaped transverse cross section including a vertical base wall portion and a pair of outwardly extending horizontal wall portions extending from opposite ends of the base wall portion, and 2) bending the U-shaped configuration of the sheet including bending the base wall portion generally within its plane while stretching one of the horizontal wall portions extending from one end of the base wall portion and compressing an opposite one of the horizontal wall portions extending from an opposite end of the base wall portion a final step of the method is rigidly securing the front frame rail module and the rearward frame rail module to opposite ends of the central frame rail module.

The forward frame rail module preferably comprises a pair of front frame siderails which are roll formed and welded into a blank having a tubular construction. A hydroforming procedure which utilizes fluid pressure to form the blank into an irregular shape and pushing on the ends of the tube to obtain material flow and wall thickness (±15%) so as to obtain the required finished shape. Where closed box frame parts are to be manufactured (e.g., at forward portions of the frame which absorb crash energy), stamping becomes even more problematic since a single integrally formed tubular member cannot be stamped. Instead, where tubular frame parts are required, it is necessary to stamp a plurality of elongated sections which must be longitudinally welded. For example, two facing U-shaped sections may be welded into a box-like sectional configuration. Such a construction is not as strong or dimensionally accurate as one in which an integrally formed tubular member is employed. It can also be appreciated that this stamping and welding process requires even further resources, such as welding material and additional man-hours to complete the weld.

It should be noted that roll forming can be used to manufacture a tubular member for the forward portion of the siderail. For example, to form the box-shaped configuration noted in the aforementioned '618 patent, it is necessary to roll the side edges of the strip material into the squared cross sectional shape until the side edges of the strip material are brought into abutting relation and then welded. More recently, however, it has been proposed to integrally form a closed section, tubular vehicle frame member from a tubular blank in what is known as a hydroforming process. See, example, U.S. Pat. Nos. 5,107,693, 5,233,854, 5,333,775, 4,567,743, 5,070,717, 5,239,852 and 5,339,667. While hydroformed frame members are highly advantageous for the forward portions of the siderail frame assembly, heretofore, the related art has not provided a modular motor vehicle frame assembly having hydroformed forward frame rail members or siderails and roll formed and bent U-shaped central frame rail members.

In accordance with the principles of the present invention each of the front frame siderails are preferably formed by 1) placing a metallic tubular member into a cavity of a die mold, the die mold having an interior surface defining a shape of the cavity, and 2) providing a fluid interiorly to the metallic tubular member with sufficient pressure so as to expand the tubular member outwardly into engagement with the interior surface of the die mold to substantially conform the tubular member to the shape of the cavity.

The present invention also achieves its objective by providing a rail frame assembly for a motor vehicle comprising a rearward frame module having a pair of generally parallel rearward frame rail members interconnected by a rearward cross-member assembly; a central frame module comprising a pair of generally parallel central frame rail members interconnected by a central cross-member assembly, the central frame members each having a generally U-shaped transverse cross-sectional configuration including a vertical base wall portion and a pair of outwardly extending generally parallel horizontal wall portions extending from opposite ends of the base wall portion, the U-shaped central frame members each being bent between two spaced positions thereof, and one of the horizontal wall portions extending from one end of the base wall portion having metallic grains therein substantially stretched at a location between the spaced positions and an opposite one of the horizontal wall portions extending from an opposite end of the base wall portion having metallic grains therein substantially compressed at the location between the spaced positions; and a forward frame module comprising a pair of generally parallel tubular forward frame rail members interconnected by a forward cross-member assembly.

DETAILED DESCRIPTION OF THE DRAWINGS

FIGS. 4(A)–4(J) are cut-away sectional views showing heavy metal rollers used in the roll forming method of the present invention.

FIGS. 5(A)–5(D) are schematic views showing the bending fixture used in the bending operation of the present invention.

DETAILED DESCRIPTION OF THE PREFERRED EMBODIMENT OF THE INVENTION

Figure 1:
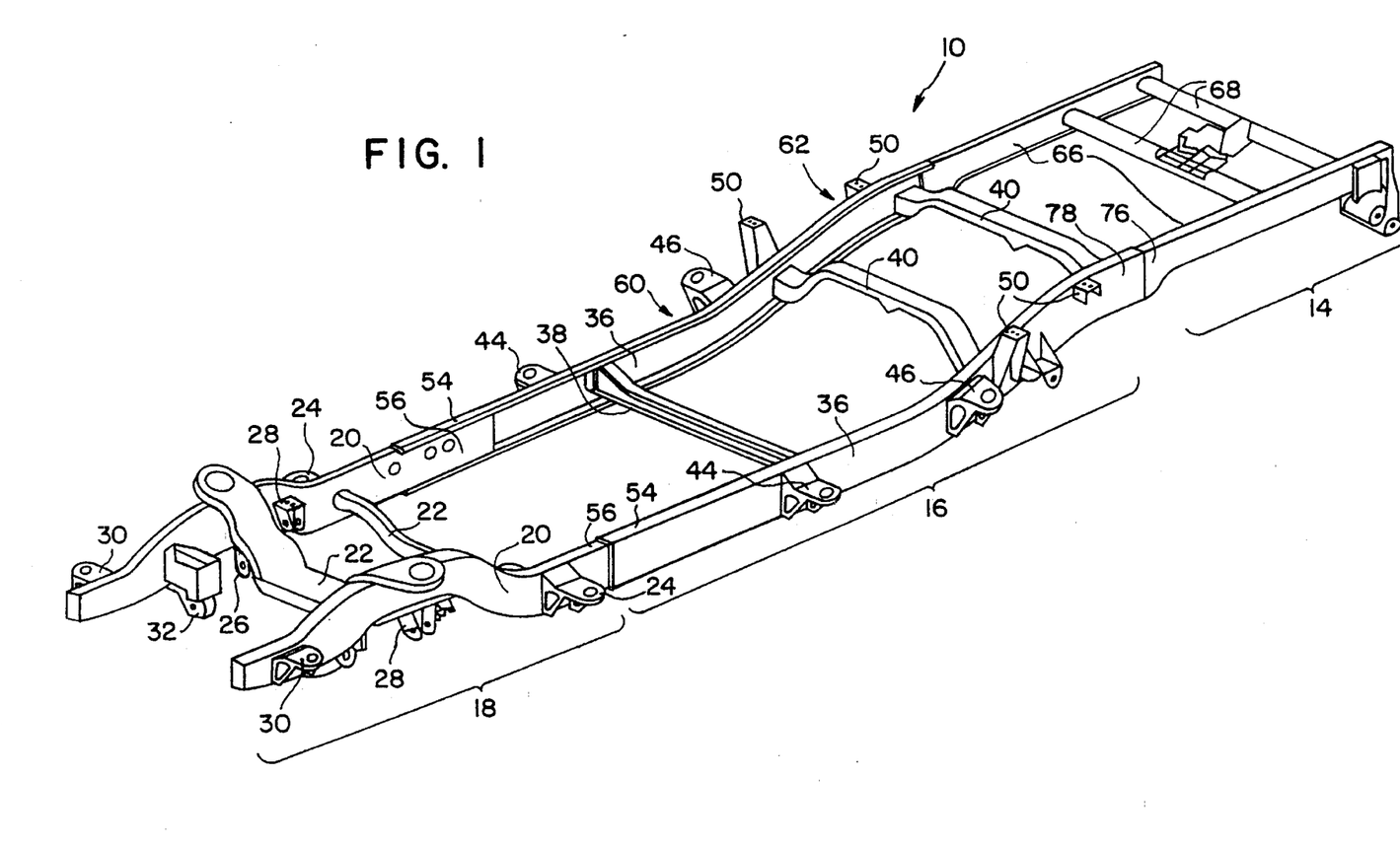
FIG. 1 is a perspective view showing the frame rail assembly of the present invention.

In FIG. 1, there is shown generally a rail frame assembly 10 manufactured in accordance with the principles of the present invention. The frame rail assembly 10 is preferably modular in design and comprises a rearward frame module, generally indicated at 14, a central frame module, generally indicated at 16, and a forward frame module, generally indicated at 18. The forward frame module includes a pair of laterally spaced, longitudinally extending tubular forward frame rail or siderail members 20, each having a closed transverse cross-section, preferably rectangular in form so as to provide sufficient strength and support for crash energy management. The forward frame rail members 20 are interconnected by cross rail members 22, which are also preferably tubular in form for added torsional rigidity of the frame assembly. The forward frame module 18 is adapted to have numerous vehicle components mounted thereon. For example, the forward frame module includes body mounting brackets (for example, as indicated by numeral 24), rack and pinion steering brackets 26, engine mounting brackets 28, radiator support bracket 30 and a control arm bracket 32. As will be described in more detail later, the forward frame module 18 is preferably formed in a hydroforming process, which allows the tubular forward frame rail members 20 to have a substantially equal wall thickness throughout. In addition, during the hydroforming process, it is not necessary to provide a longitudinal seam weld, so that the tubular members are integrally formed, and are stronger and superior dimensionally than those manufactured by stamping or roll forming which require such seam welds.

The central frame module 16 includes a pair of parallel central frame rail or siderail members 36 interconnected by cross-members, such as bearing support cross-member 38 and fuel tank cross-members 40. The central frame module also includes forward body mount brackets 44, rearward body mount brackets 46, and rear box mount brackets 50. The central frame rail members 36 are rigidly connected at their forward ends 54 to respective rearward ends 56 of tubular frame rail members 20. Preferably, the rigid connection is accomplished by welding the ends to one another. It is also preferred that the central frame rail members 36 have a preferably transverse cross-section, with the opened portion of the U configuration facing inwardly towards the center of the frame assembly. This configuration for the rail members 36 allows various components to be easily mounted thereon, while also providing the central frame module 16 with substantial strength.

Central frame rail members 36 are formed first in a rolling operation to provide the U-shaped cross-sectional configuration, and then in a bending operation to give the rail members 36 slight forward and rearward vertical bends, indicated at 60 and 62, respectively. The longitudinally spaced forward and rearward bends 60 and 62 accommodate various components, such as wheel and axle mounts, and the vehicle suspension.

Figure 2A:
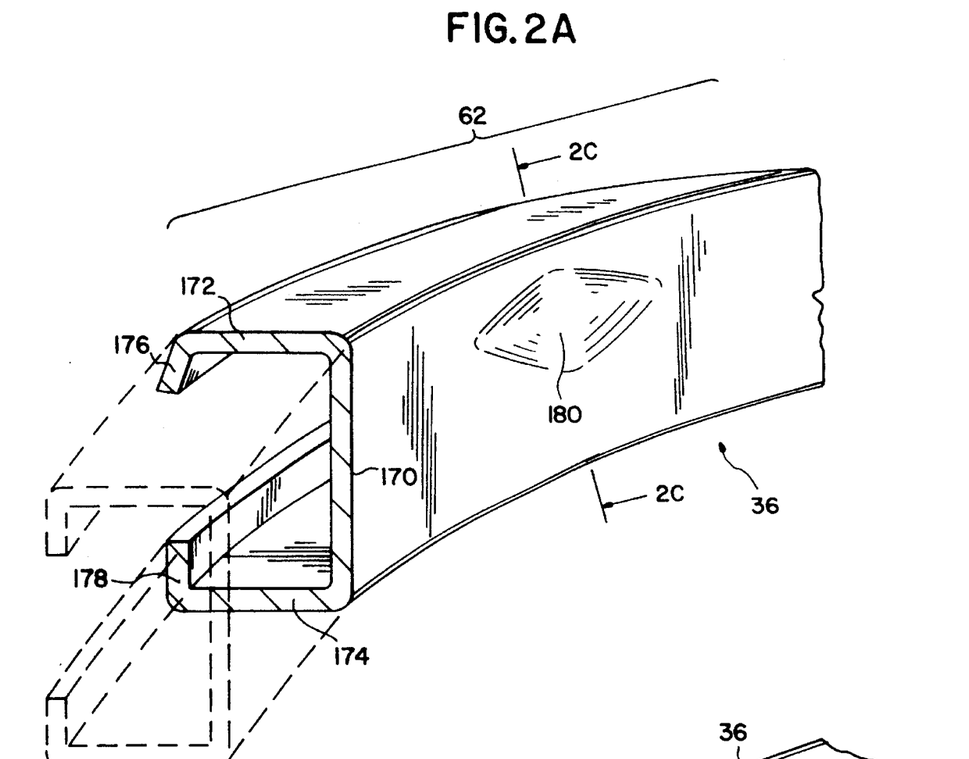
FIG. 2(A) is cut-away perspective view, partly in section, showing a bent portion of a central frame rail member of the present invention.

FIG. 2(A) is an enlarged view of a portion of one central frame rail member 36 at rearward bend 62 thereof. A substantially U-shaped transverse cross-sectional configuration of this frame rail member 36 is shown. The U-shaped configuration comprises a base or vertical wall portion 170, which is substantially vertically disposed when the central frame rail members 36 are assembled into the completed rail frame assembly 10. The U-shaped cross-section further includes a pair of horizontal wall portions or leg portions 172, 174 extending from opposite transverse ends of the vertical wall or base portion 170. The horizontal wall portions 172, 174 are generally parallel to one another and are substantially horizontally disposed when the central rail frame members are assembled into a completed rail frame assembly. The horizontal wall portions 172, 174 extend generally inwardly towards the vehicle, so that, as noted above, the open portion of the U-shaped configuration of each central frame rail member likewise faces inwardly towards the center portions of the vehicle frame assembly to facilitate mounting of cross members and other components. In FIG. 2(A), it can be seen that U-shaped configuration also includes a pair of inwardly extending flange portions 176, 178 extending towards one another from respective ends of horizontal wall portions 172, 174 opposite the ends connected with base portion 170. These flanges may optionally be omitted.

When the flanges 176, 178 are provided, however, it can be appreciated from the figure that flange 176 extending along the outer portion of the bend is slightly outwardly flared as a result of the bending process. More specifically, as can be appreciated from the dashed line portion of FIG. 2(A) showing a straight portion of the rail member 36, flange 176 is substantially parallel with vertical wall portion 170 where central rail member 36 is not bent. As also a result of the bending process, it can be appreciated that the grains of metal in horizontal wall member 172 (at the outer portion of the bend) are stretched, while the grains of metal in horizontal wall member 174 (at the inner portion of the bend) are compressed.

Stretching and thinning of the vertical wall portion or base portion 170 also occurs during bending of the central frame rail member. Most of this stretching and thinning occurs towards the upper portion of the vertical wall portion 170 (approximately one third the way down), adjacent the outer bend. As suggested by a generally diamond shaped stretching pattern, generally indicated at 180, most of the stretching of vertical wall portion 180 occurs at a midpoint along the bend 62.

Figure 2B:
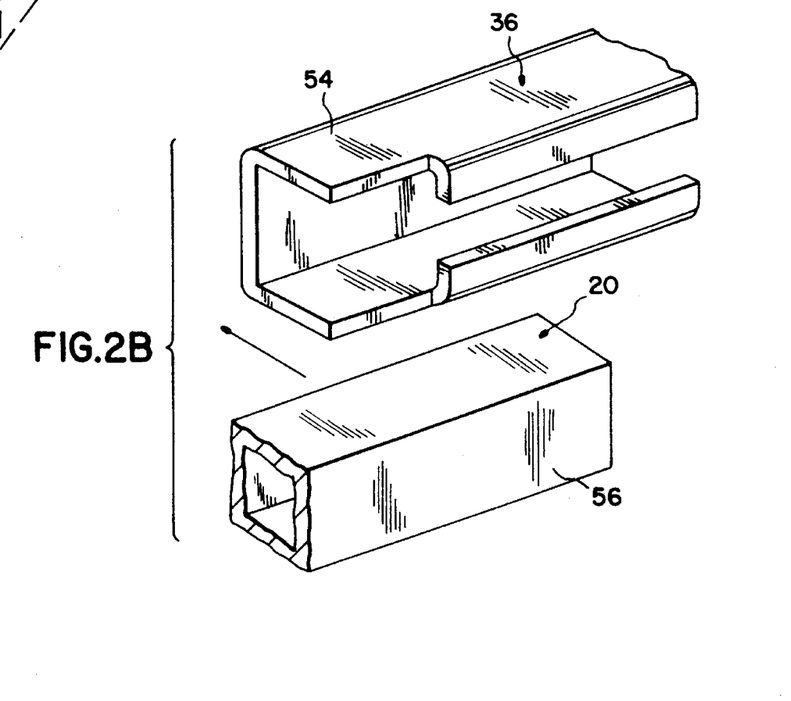
FIG. 2(B) is a cut-away perspective view, partly in section, showing a forward end of a central frame rail member and a rearward end of a forward frame rail member of the present invention, and a method for rigidly connecting the same to one another.

In FIG. 2(B), the forward end 54 of a central frame rail member 36, and the rearward end 56 of a tubular forward frame rail member 20 are shown. It can be appreciated that where flanges 176 and 178 are provided throughout length of the central frame rail member 36, it is preferable for the rearward end 56 of frame rail member 20 to be telescopingly received within central frame rail member 36 before they are secured (e.g., via welding). Advantageously, however, and as shown in FIG. 2(B), flanges 176 and 178 may be removed at forward end portion 54 to enable the U-shaped section to laterally receive the rearward end 56 of rail members 20. It has been found that this greatly facilitates the manufacturing operation.

Figures 2C, 2D:
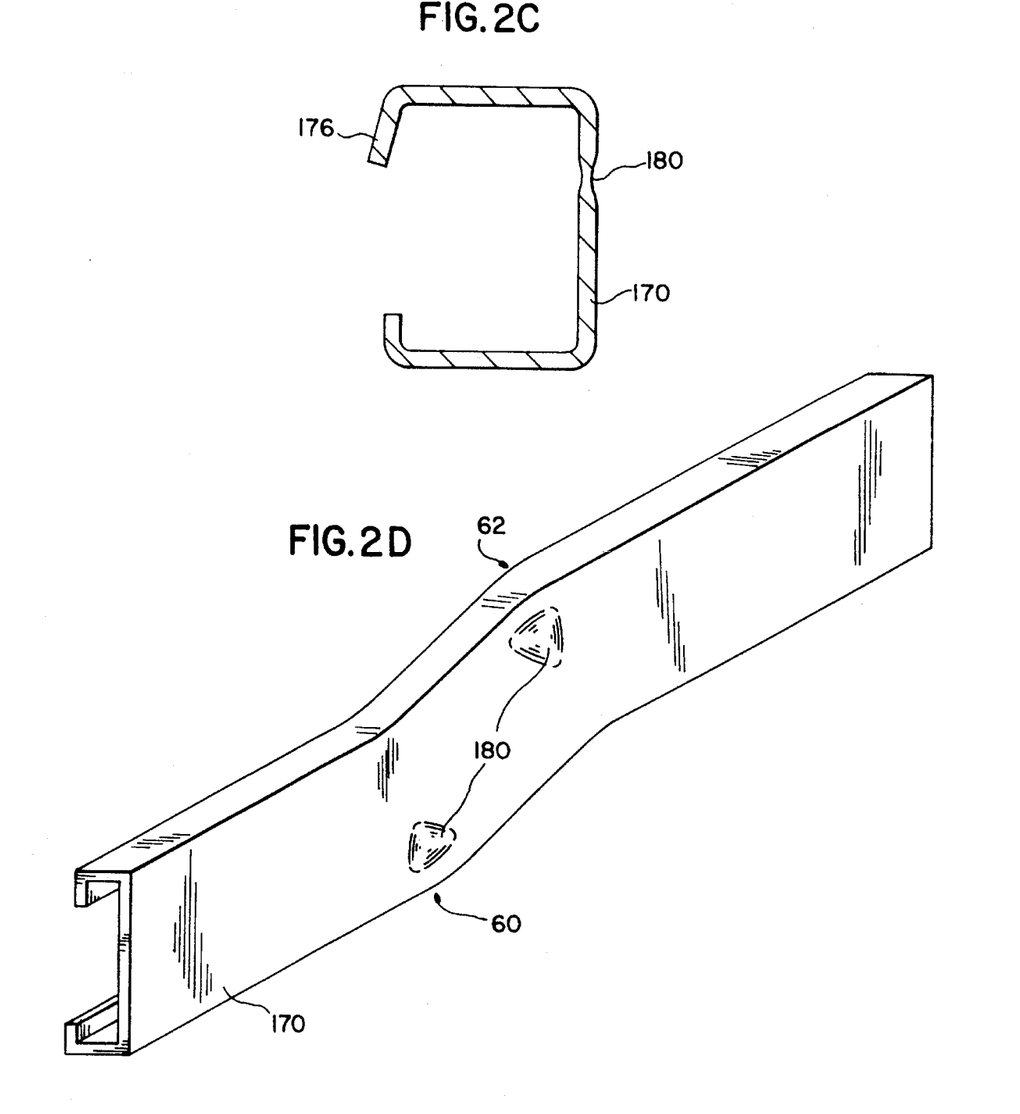
FIG. 2(C) is a cross-sectional view taken along the line 2(C)—2(C) in FIG. 2(A).
FIG. 2(D) is a perspective view showing a central frame rail member of the present invention.

FIG. 2(C) is a cross-sectional view taken along the line 2(C)—2(C) in FIG. 2(A). This figure shows the thinned portion 180 at the central portion of the bend (60 or 62) in vertical wall portion 170. FIG. 2(D) is a perspective view showing the central frame rail member, and in particular, highlights the locations of the thin walled portions 180 of the vertical wall portion 170.

Referring now back to FIG. 1, it can be seen that rear frame module 14 includes a pair of parallel rearward frame rail or siderail members 66 interconnected by cross-members 68, which are adapted to mount or carry a spare tire. The rearward frame rail members 66 have a U-shaped transverse cross section, and have forward ends 76 thereof rigidly secured to rearward ends 78 of the central frame rail members 36. Similarly to what has been described with respect to FIG. 2(B), forward portion 76 is telescopingly or laterally received within rearward portions of the central frame rail member 36, and then welded.

From FIG. 1, it can be appreciated that the forward portion 76 of the rearward frame rail members 66 has a somewhat expanded height in comparison with more rearward portions of the rail member. More particularly, it can be seen that, as with the central frame rail members, the rearward frame rail members have a base portion and a pair of leg portions extending in generally parallel relation to one another from opposite transverse ends of the base portion towards the inner structure of the frame assembly. The base portion has relatively greater length between the transverse ends at the forward portion 76 thereof relative to the length between the transverse ends at more rearward portions thereof. In order to provide the rearward frame rail members 66 with differing height dimensions, it is preferred to form such members 66 in a conventional stamping operation, as it is difficult to provide a rail member with such different dimensions in a rolling process. However, where the rearward frame rail members 66 are to have a substantially constant vertical wall height, a rolling technique may be employed.

The forward frame module 18, central frame module 16 and rearward frame module 14 are preferably each formed as individual units, and then assembled into the completed frame assembly 10. It can be appreciated that one or more of the modules can be interchanged with modules of different configurations (e.g., with different lengths or bends) for use in different vehicles. This modularity offers substantial savings in manufacturing costs, as each module can potentially be used in several different types of vehicles.

Figure 3:
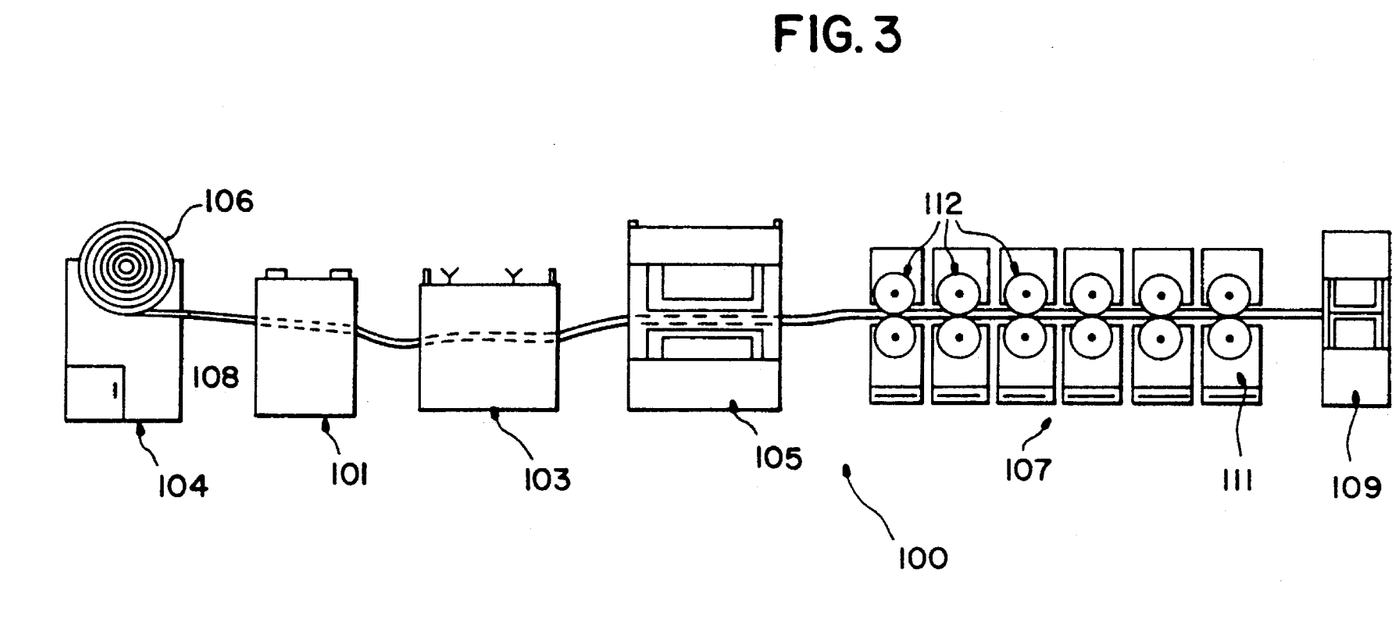
FIG. 3 is a schematic view showing the roll forming apparatus of the present invention.

Referring now to FIG. 3, there is shown a rolling apparatus for forming the central frame rail members 36 of the present invention. The rolling apparatus, generally indicated at 100, includes an uncoiling station 104 for uncoiling large strips or rolled sheet of raw metal material 106, preferably steel. The metal coil is uncoiled so that a flat sheet of material 108 is fed through a series of metal forming devices, including a temper mill 101, a stock straightener 103, a pre-pierce press 105, a rolling mill 107, and a cut-off press 109. The rolling mill 107 include several pairs of cooperating heavy metal rollers 112. Preferably, the last set of rollers comprises a twisting station 111 which straightens out any twists provided in the roll formed section during formation.

The tempering mill 101 accomplishes cold metal reduction before the rolling process. This provides additional strength to the metal, while also reducing its thickness (e.g., by about 5%) to make the frame lighter as a whole, while also enabling the metal to be formed with closer tolerances. The stock straightener 103 flatens the metal sheet to remove any imperfections or inconsistencies in the sheet. The pre-piercing press 105 punches holes required in the central frame rail member for mounting various structures and for securement of the central frame rail member to other frame components. After the metal sheet is rolled into the U-shaped section, a predetermined length of rolled metal is cut by cut-off press 109 to be bent into the desired configuration of the central frame rail member.

Figure 4A:
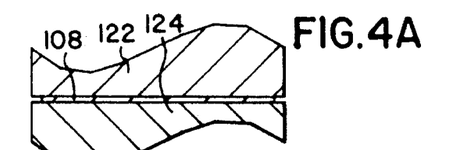
Figure 4B:
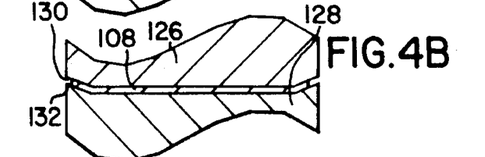
Figure 4C:
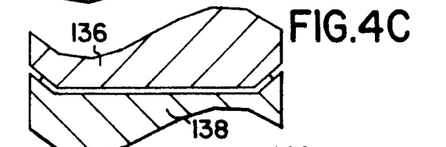
Figure 4D:
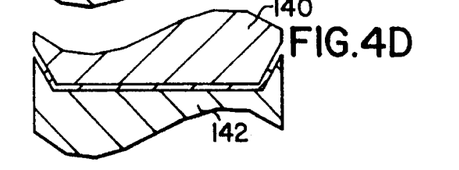
Figure 4E:
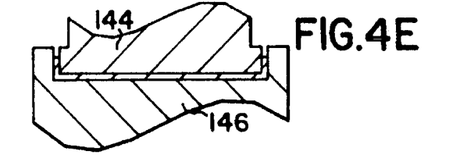
Figure 4F:
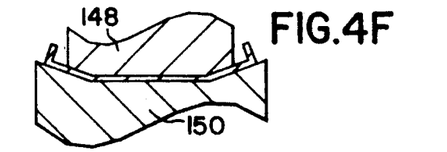
Figure 4G:
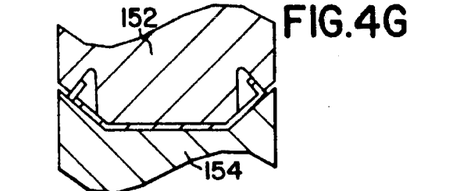

Turning now to FIGS. 4(A)–4(I), there is shown a more detailed view of the succession of pairs of the type of metal rollers 112 used within rolling mill 107 to form the U-shaped central frame rail member 36. More specifically, in FIG. 4(A), there is shown a partial sectional view of a first pair of rollers 122 and 124 for initially flattening the sheet of raw material 108 in order to remove any imperfections or inconsistencies which may exist in the raw sheet. In FIG. 4(B) a first shaping operation is achieved with rollers 126 and 128. As can be appreciated by FIG. 4(B), the outer material engaging surface 130 of roller 126 is slightly convex in configuration, while the outer material engaging surface 132 of roller 128 is slightly concave in configuration. These roller surfaces compress material sheet 108 therebetween while in rolling engagement with opposite sides of the sheet. In addition to shaping the sheet of raw material, the rolling engagement of each of the rollers also serves to feed the sheet to the next pair of rollers, for example, as those indicated by numerals 136 and 138 in FIG. 4(C). In the progression from FIG. 4(C) to FIG. 4(D) and then FIG. 4(E), it can be appreciated that the cooperating pairs of rollers 136 and 138, 140 and 142, 144 and 146 progressively bend the outer longitudinal portions of sheet 108 to form what will be flanges 176 and 178 at ends of the U-shaped configuration. Then, in FIGS. 4(F)–4(I), it can be seen that a second progression of bends is accomplished by utilizing roller pairs 148 and 150, 152 and 154, 156 and 158, and 160 and 162, until the sheet of material is formed into the final desired configuration.

Figure 4H:
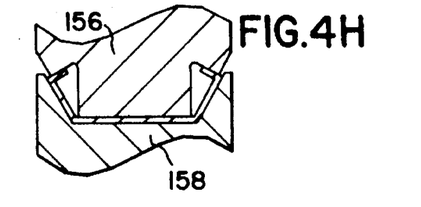
Figure 4I:
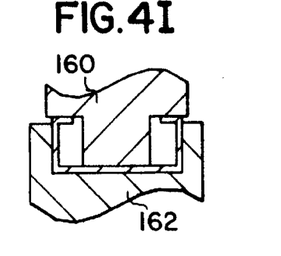
Figure 4J:
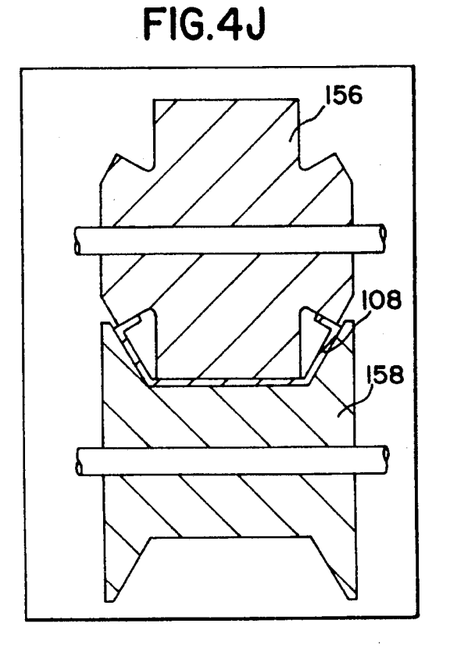

FIG. 4(J) simply shows a full sectional view of rollers 156 and 158 of FIG. 4(H), for further illustrative purposes.

As a result of the process steps illustrated in FIGS. 3 and 4(A)–4(I), it can be appreciated that a substantially continuous U-shaped cross-sectional configuration of metal is formed, the continuous sheet of metal being cut into desired lengths for the central frame rail members 36 in a subsequent cutting procedure (not illustrated). The rolling procedure is highly advantageous over the conventional stamping, since an entire roll of material 106 can be processed in continuous fashion without the need to move rail frame sections to and from various stamping stations. In addition, the U-shaped section of the central frame rail members can be more accurately formed by the roll-forming procedure than by stamping, since the progression of bends permits the material to be slowly shaped as desired with each step. While nine rolling steps are shown in the Figures, it can be appreciated that more or less may be used, it being understood that, generally, a more accurately formed section can be accomplished with more steps. For example, in FIG. 3, only six pairs of rollers are shown.

Figure 5A:
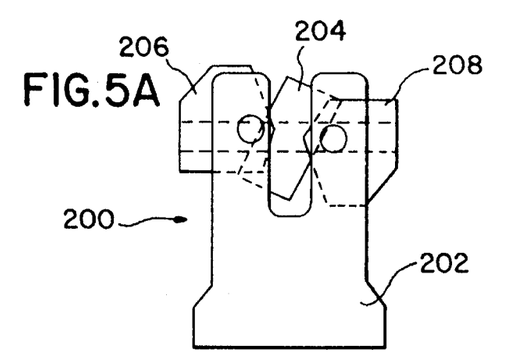
Figure 5B:
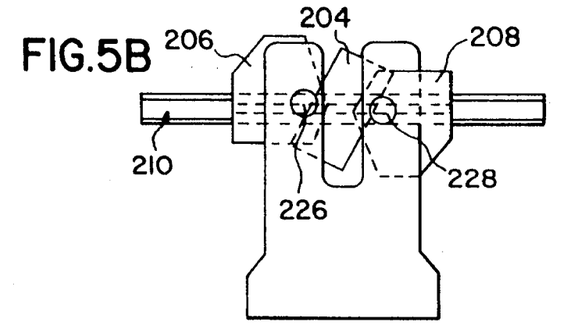

In FIG. 5(A) there is shown a fixture, generally indicated at 200, utilized in bending of the straight roll-formed frame rail member manufactured by the procedure illustrated in FIGS. 3 and 4(A)–4(I). The fixture 200 includes a frame 202, a stationary frame rail support 204, and two bending arms 206 and 208. The fixture 200 is specifically manufactured and adapted to bend U-shaped sections (with or without flanges) of metal having a size, shape and weight of a typical straight frame rail member. Initially, and as shown in FIG. 5(B), the straight frame rail member, generally indicated at 210, is bolted to the stationary support 204 and each bending arm 206 and 208. More specifically, and as illustrated in FIG. 5(D), the stationary support and each arm are each provided with a clamping arrangement, generally indicated by 201, which includes a first mount 212 adapted to support the lower horizontal wall portion 174 and vertical wall portion 170 of the straight-formed rail member 210. After the straight roll-formed frame rail is mounted on first mount 212, a plurality of wedges 216, 218 and 220 are inserted into the inner confines of the U-shaped sectional frame rail member. More particularly, outer wedges 216 and 220 are first laterally inserted into the inner confines of the frame-rail member (e.g., moving left to right in FIG. 5(d), and then the central wedge 218 is forced between the outer wedges 216, 220, thereby causing the outer wedges 216, 220 to move away from one another into substantially continuous contact with the inner surface of horizontal wall portions 172, 174 and vertical wall portion 170. The leading surface of the central wedge may also contact the inner surface of the vertical wall portion 170. Finally, a second mount 222 is secured behind the wedges to engage the outer surfaces of flange portions 176, 178 and the outer surface of upper horizontal wall portion 172. As a result of this construction, the frame-rail member is substantially captured at all surfaces thereof which are clamped within the fixed support 204 and each arm 206 and 208. The capturing of such surfaces prevents substantial buckling, twisting, or other unwanted deformation of the U-shaped frame-rail member during the bending procedure.

Figure 5C:
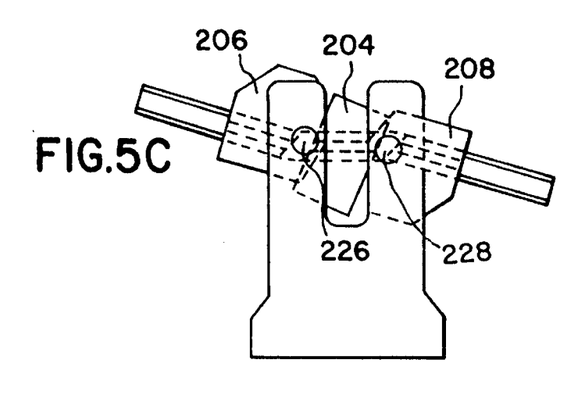
Figure 5D:
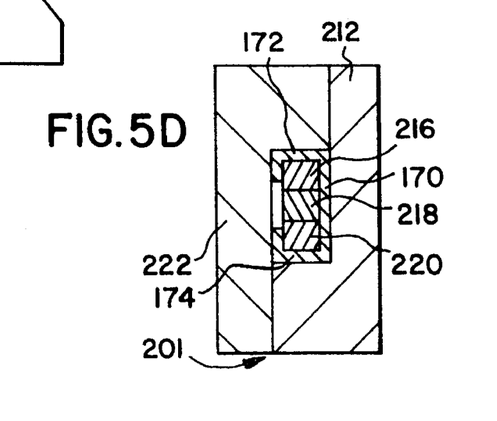
FIG. 5(D) is a sectional view showing a clamping arrangement for clamping a U-shaped section rail member during the bending operation of the present invention.

To bend the straight U-section frame rail member, the arms 206 and 208 are pivotally forced (in a clockwise direction in FIG. 5(C)) about respective axes 226 and 228, by hydraulics or other forcing means to form the two longitudinally spaced bends in the frame rail member.

It can be appreciated that, as a result of the bending operation illustrated in FIGS. 5(A)–5(D), and as described above with respect to FIG. 2(A), the resultant frame-rail member 36 has the metal grains therein substantially altered as a result thereof. More specifically, it can be appreciated that, at outer portions of each bend, the metal grains are stretched to some degree, while at inner portions of each bend, the metal grains are compressed or condensed to some degree. In addition, at each of the longitudinally spaced bends, the base portion is bent within its own plane. All stretching or compression occurs in areas between the spaced positions at which the rail frame member is bolted and clamped by the respective clamping arrangements 201 carried by the fixed support 204 and arms 206, 208. The stretching and compression of metal, e.g., at the horizontal leg portions 172 and 174, is quite unlike what occurs when a U-section frame-rail member is formed in a stamping operation, since no bending, stretching, or compression of the horizontal or vertical wall portions is performed during stamping.

Figure 6A:
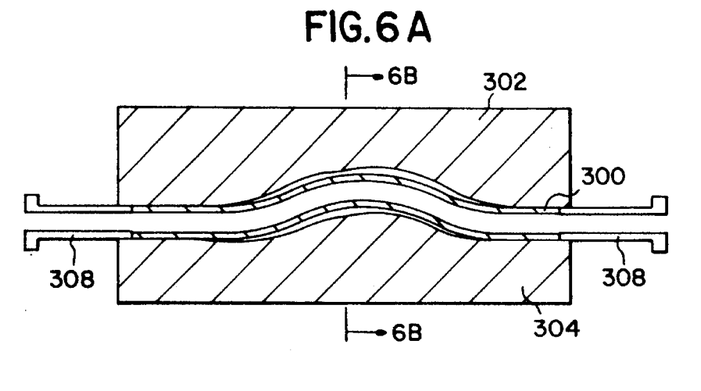
FIGS. 6(A), 6(C) and 6(E) are longitudinal sectional views showing the hydroforming mold assembly and tubular blank used in forming the tubular forward frame members of the present invention.
Figure 6B:
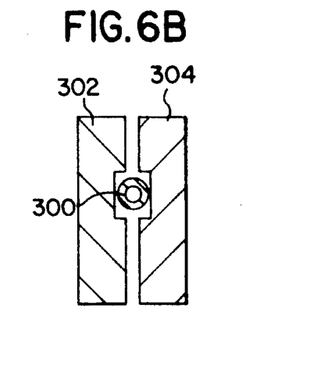
FIGS. 6(B), 6(D) and 6(F) are transverse sectional views of FIGS. 6(A), 6(C) and 6(E), respectively, showing the hydroforming mold assembly and tubular blank used in forming the tubular forward frame members of the present invention.
Figure 6C:
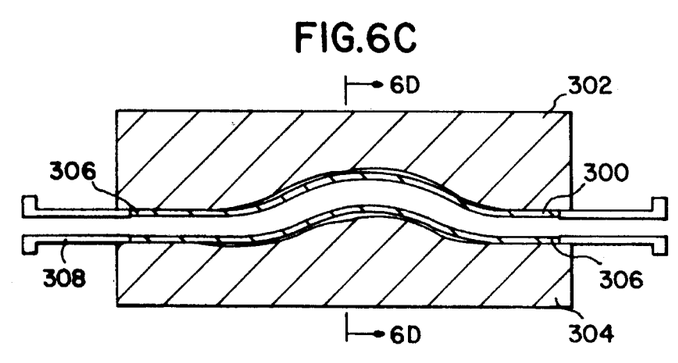
Figure 6D:
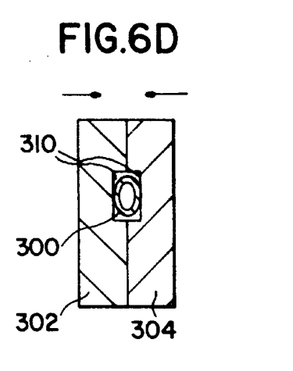

Referring now to FIGS. 6(A)–6(F), there is shown the method for forming the tubular forward frame rail-members 20 of the forward frame module 18. As shown in FIG. 6(A), a pre-bent tubular blank 300 is inserted between cooperating die halves 302 and 304. The blank can be manufactured by any known process. Preferably, the blank can be formed by rolling a sheet of metallic material into a complete closed tubular section and then seam welding it. Typically, the tubular member 300 is pre-bent mechanically, for example, by use of mandrels in a CNC (computer numerically controlled) bending machine. After the tubular member 300 is inserted into the die, hydroforming ports 308 are engaged with opposite ends 306 of the tubular structure 300, and sealed thereto. As the die halves 302 and 304 are moved towards one another, the tube 300 is slightly crushed, for example into an oval cross-sectional shape, as shown in FIG. 6(D).

Next, high pressure water, of up to 10,000 atmospheres is provided through the hydroforming ports 308 and into the inner confines of tubular structure 300. This high pressure causes the tubular structure to expand outwardly into engagement with the interior surface 310 defining the cavity within the die. This causes the tubular structure to take the shape of the interior surface 310, as shown in FIG. 6(F).

As the high pressure fluid is provided into the tubular structure, the hydroforming ports 308 are forced inwardly against the opposite ends 306 of the tube to replenish the wall thickness of the metal as the tube expands into contact with the inner surface 310 of the die.

It can be appreciated that during the aforementioned hydroforming process, the amount of metal per unit length of tube is varied. More specifically, as the linear exterior circumference is outwardly expanded, metal is advantageously replenished from the side portions as a result of the inward pushing of ports 308 so that the wall thickness is maintained within ±10% of the original blank. In the areas of greatest expansion, the exterior circumference is increased by more than 10%, while the wall thickness is maintained within the ±10% range. The forward frame rail members preferably have the greatest circumference (the most metal per unit length) at portions where the most strength is required. For example, in FIG. 1, it can be seen that the tubular forward frame rail members 20 have the greatest circumference at a position generally at the forward bent portions for mounting the suspension and adjacent engine mounting brackets 28. The replenishing of metal from the side portions also advantageously prevents rupturing of the tube 300 during the radial expansion thereof.

Figure 6E:
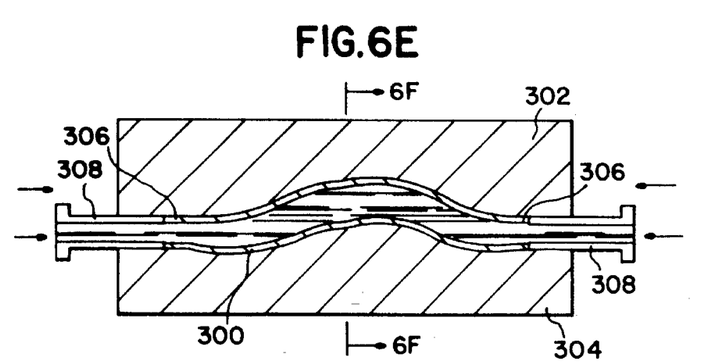
Figure 6F:
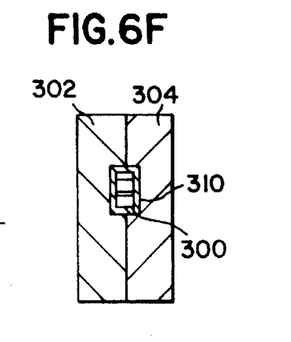
Figure 7:
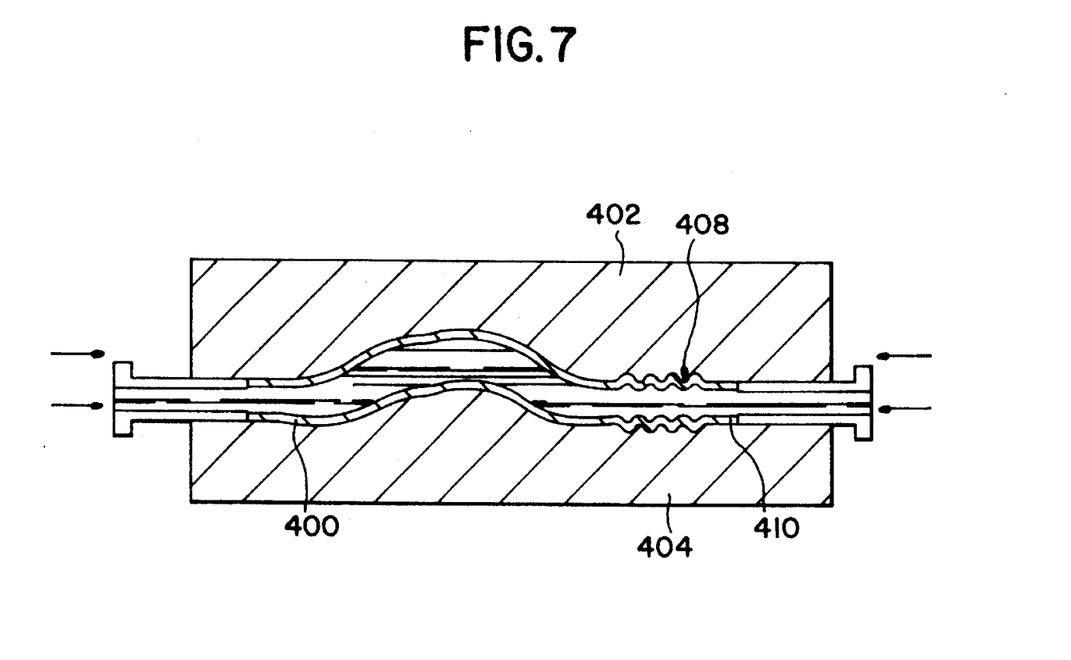
FIG. 7 is a longitudinal sectional view similar to that in FIG. 6(E), but showing an alternate embodiment of the present invention.

FIG. 7 is substantially similar to FIG. 6(E), but shows an alternate configuration for the hydroforming mold assembly and forward tubular siderail members. More particularly, in FIG. 7 it can be seen that the inner surfaces of the molding cavity have a corrugated configuration or other shape, as generally indicated at 408. This configuration provides the formed tubular member with a shape that causes an axial collapse at near constant forces. As the forward end 410 of the tubular member is eventually connected with the front bumper of the automobile, the arrangement advantageously functions to enhance shock absorbing characteristics of the frame assembly in the event of a forward collision.

The hydroforming molding technique employed herein is disclosed in greater detail, for example, in "Industrieanzeiger" No. 20 of 9, March 1984; and "Metallumformtechnik" Issue 1D/91, zp 15 ff: A. Ebbinghaus: "Precision Workpieces in Light Construction, Manufactured Through Internal High Pressure Mouldings"; and "Werkstatt und Betrieb" 123 (1990), 3, P. 241–243: A. Ebbinghaus: "Efficient Designing with Precision Components Formed by the Internal High-Pressure Technique": and "Werkstattt und Betrieb" 122 (1991), 11 (1989), P. 933–938 A. Ebbinghaus, "Die-forging With New technology", the above publications being fully incorporated herein by reference.

While the invention has been illustrated and described in detail in the drawings and foregoing description, the same is to be considered as illustrative and not limiting in character, it being understood that the preferred embodiment has been shown and described and that all changes and modifications that come within the spirit and scope of the appended claims are to be protected.

What is claimed is:

1. A method of manufacturing a frame assembly for a motor vehicle, comprising the steps of:

forming a rearward frame rail module;

forming a forward frame rail module;

forming a central frame rail module comprising a pair of longitudinal central frame siderails, each of said central frame siderails being formed by 1) moving a sheet of metallic material through a series of cooperating rollers so that opposite sides of said sheet are rollingly engaged by said rollers in a manner which bends said sheet to form a longitudinal member having a generally U-shaped transverse cross section including a base portion and a pair of leg portions extending in generally parallel relation to one another from opposite ends of said base portion; and 2) bending said longitudinal member having said U-shaped cross-section so that i) said base portion is bent generally within its plane, ii) one of said leg portions extending from one end of said base portion is stretched, and iii) an opposite one of said leg portions extending from an opposite end of said base portion is compressed; and rigidly securing said front frame rail module and said rearward frame rail module to opposite ends of said central frame rail module.

2. A method according to claim 1 wherein said forward frame rail module comprises a pair of front frame siderails and wherein each of said front frame siderails is formed by:

roll forming and welding a sheet of metallic material into a metallic tubular member;

placing the metallic tubular member into a cavity of a die mold, said die mold having an interior surface defining a shape of said cavity;

providing a fluid interiorly to said metallic tubular member with sufficient pressure so as to expand said tubular member outwardly into engagement with said interior surface of said die mold to substantially conform said tubular member to the shape of said cavity.

3. A method according to claim 2, wherein the bending step further comprises engaging inner and outer surfaces of said longitudinal member with a bending apparatus at longitudinally spaced positions on opposite sides of a portion of the longitudinal member which is bent; and moving said bending apparatus while in said engagement with said inner and outer surfaces to bend said base portion and said leg portions at locations between said spaced positions.

4. The method according to claim 3, wherein the engaging step comprises the steps of rigidly engaging the outer surface of said longitudinal member including an outer surface of said base portion and outer surfaces of each of said leg portions with an exterior wall mounting assembly of said bending apparatus at said spaced positions; and moving rigid wedge members of said bending apparatus transversely relative to said longitudinal member into inner confines of said U-shaped configuration and into rigid engagement at said spaced positions with the inner surface of said including an inner surface of said base portion and inner surfaces of each of said leg portions.

5. The method according to claim 4, wherein the exterior wall mounting assembly comprises a fixed mount and a movable mount engaging said outer surfaces of said longitudinal member at said spaced positions respectively, and wherein said wedge members engage said inner surfaces of said longitudinal member at said spaced positions opposite said fixed mount and said movable mount, and wherein said bending step further comprises the steps of moving an arm of said bending apparatus to move said movable mount and the wedge members opposite thereto relative to said fixed mount and the wedge members opposite thereto so that the base portion is bent generally within its plane between said spaced positions, and so that said one of said leg portions is stretched and said opposite one of said leg portions is compressed at a location between said spaced positions.

6. The method according to claim 4, wherein said longitudinal member further comprises flange portions extending generally towards one another and parallel to said base portion from ends of said leg portions opposite said base portion, and wherein the engaging step further comprises the steps of rigidly engaging the outer surfaces of said flange portions with said exterior wall mounting assembly of said bending apparatus at said spaced positions; and rigidly engaging the inner surfaces of said flange portions with said rigid wedge members of said bending apparatus at said spaced positions.

7. The method according to claim 5, wherein the exterior wall mounting assembly comprises a fixed mount and a movable mount engaging said outer surfaces of said longitudinal member of said sheet at said spaced positions respectively, and wherein said wedge members engage said inner surfaces of said longitudinal member at said spaced positions opposite said fixed mount and said movable mount, and wherein said bending step further comprises the steps of moving an arm of said bending apparatus to move said movable mount and the wedge members opposite thereto relative to said fixed mount and the wedge members opposite thereto so that the base portion is bent generally within its plane between said spaced positions, and so that said one of said leg portions is stretched and said opposite one of said leg portions is compressed at a location between said spaced positions.

8. The method according to claim 7, wherein said step of moving said arm during bending causes one of said flange portions extending from said outer one of said leg portions to move outwardly away from said base portion so that said flanges no longer generally extend towards one another.

9. The method according to claim 7, wherein said rigidly securing step comprises the step of removing the flange portions at ends of said central frame siderails to be rigidly secured to ends of said front frame siderails, and moving said ends of said tubular front frame siderails in a direction generally orthogonally towards said inner surface of said base portion until said ends of said tubular front frame siderails engage said inner surfaces of said central side framerails at said end thereof having said removed flange portions, and welding said ends of said front frame siderails to said inner surfaces of said central frame siderails.

10. The method according to claim 2, further comprising the step of inwardly forcing opposite ends of said tubular member generally towards one another while providing said fluid into said tubular member.

11. A method according to claim 2, further comprising the step of bending said tubular member before placing it into said die mold cavity.

12. A method according to claim 2, wherein the step of forming said rearward frame rail module comprises the steps of:

moving a sheet of metallic material between cooperative stamping dies constructed and arranged to compressively engage opposite sides of said sheet therebetween so as to bend said sheet into a configuration having a generally U-shaped transverse cross section including a base portion and a pair of outwardly extending leg portions extending from opposite ends of said base portion.

13. A method according to claim 2, wherein said rigidly securing step comprises the step of welding said front frame rail module and said rearward frame rail module to opposite ends of said central frame rail module.

14. A method according to claim 2, further comprising the step of varying the amount of metal per unit length of said tubular member as said tubular member is expanded.

15. A method according to claim 14, further comprising the step of expanding the linear exterior circumference of said tubular member in predetermined portions thereof by an amount greater than 10% of the original linear exterior circumference while maintaining a wall thickness within ±10% of the original wall thickness.

16. The method according to claim 1, wherein the aforementioned bending of the longitudinal member having said U-shaped cross-section is accomplished generally at a first longitudinal portion thereof and further comprising the steps of:

bending said longitudinal member at a second longitudinal portion thereof longitudinally spaced from said first longitudinal portion, said first and second longitudinal portions being bent generally in opposite directions;

said bending of the second longitudinal portion being accomplished such that i) said base portion is bent within its plane at said second longitudinal portion, ii) said one of said leg portions is compressed at said second longitudinal portion of said central frame siderails, and iii) said opposite one of said leg portions is stretched generally at said second longitudinal portion of said central frame siderails.

17. A method of manufacturing a frame assembly for a motor vehicle, comprising the steps of (a) forming a rearward frame rail module having a pair of laterally spaced, longitudinally extending rear frame siderails, each of said rear frame siderails having a generally U-shaped transverse cross section including a rear siderail base portion and a pair of rear siderail leg portions extending in generally parallel relation to one another from opposite transverse ends of said rear siderail base portion, said rear siderail base portion having a greater length between said transverse ends at a forward portion thereof relative to the length between said transverse ends at a rearward portion thereof, said frame siderails each being formed by
 i) placing a sheet of metallic material between cooperative stamping dies;
 ii) compressively engaging opposite sides of said sheet with said stamping dies so as to provide said sheet with said U-shaped transverse cross section;

b) forming a central frame rail module having a pair of laterally spaced, longitudinally extending central frame siderails, each of said central frame siderails having a generally U-shaped transverse cross section including a central siderail base portion and a pair of central siderail leg portions extending in generally parallel relation to one another from opposite transverse ends of said central siderail base portion, each of said central frame siderails being formed by
 i) moving a sheet of metallic material through a series of cooperating rollers, and
 ii) rollingly engaging opposite sides of said sheet so as to bend said sheet and thereby provide said sheet with said U-shaped transverse cross-section;

c) forming a forward frame rail module having a pair of laterally spaced, longitudinally extending tubular forward frame siderails, each of said forward frame siderails being formed by:
 i) placing a metallic tubular member into a cavity of a die mold, said die mold having an interior surface defining a shape of said cavity,
 ii) providing a fluid interiorly to said metallic tubular member with sufficient pressure so as to expand said tubular member outwardly into peripheral engagement with said interior surface of said die mold to substantially conform said tubular member to the shape of said cavity,
 iii) applying force to opposite ends of said tubular member so as to cause said ends to be moved generally inwardly towards an intermediate portion of said tubular member while said tubular member is being expanded so as to maintain a wall thickness of said tubular member within a specified range, and d) rigidly securing said rearward frame module and said forward frame module to opposite respective ends of said central frame module by
 i) securing rearward portions of said forward frame siderails to forward portions of said central frame siderails, and
 ii) securing said forward portions of the rearward frame siderails, each having said base portion with said relatively greater length between transverse ends, to rearward portions of said central frame siderails.

18. A method according to claim 17, wherein at least one portion of said metallic tubular member has its exterior circumference expanded by greater than 10% relative to its original exterior circumference while maintaining the wall thickness thereat within the predetermined range of ±10% of the original wall thickness.

19. A method according to claim 17, wherein the step of forming the central frame rail module further comprises the step of:

bending said sheet formed into said U-shaped cross-sectional configuration so that said base portion is bent generally within its plane at a first longitudinal portion and bent generally within its plane at a second longitudinal portion longitudinally spaced from said first longitudinal portion, said first and second longitudinal portions being bent generally in opposite directions so that one of said leg portions is stretched at said first longitudinal portion and compressed at said second longitudinal portion and so that the other of said leg portions is compressed at said first longitudinal portion and stretched at said second longitudinal portion.

* * * * *